Dec. 9, 1941. H. S. ACKERMAN Re. 21,968

MOTOR CONTROL VALVE

Original Filed Feb. 10, 1936 2 Sheets-Sheet 1

INVENTOR
Harold S. Ackerman
by William B. Jaspert
ATTORNEY

Dec. 9, 1941. H. S. ACKERMAN Re. 21,968

MOTOR CONTROL VALVE

Original Filed Feb. 10, 1936 2 Sheets-Sheet 2

INVENTOR
Harold S. Ackerman
by William B. Jaspert
ATTORNEY

Reissued Dec. 9, 1941

Re. 21,968

UNITED STATES PATENT OFFICE 21,968

MOTOR CONTROL VALVE

Harold S. Ackerman, Aspinwall, Pa.

Original No. 2,123,519, dated July 12, 1938, Serial No. 63,286, February 10, 1936. Application for reissue January 20, 1940, Serial No. 314,893

7 Claims. (Cl. 137—139)

Figure 1:
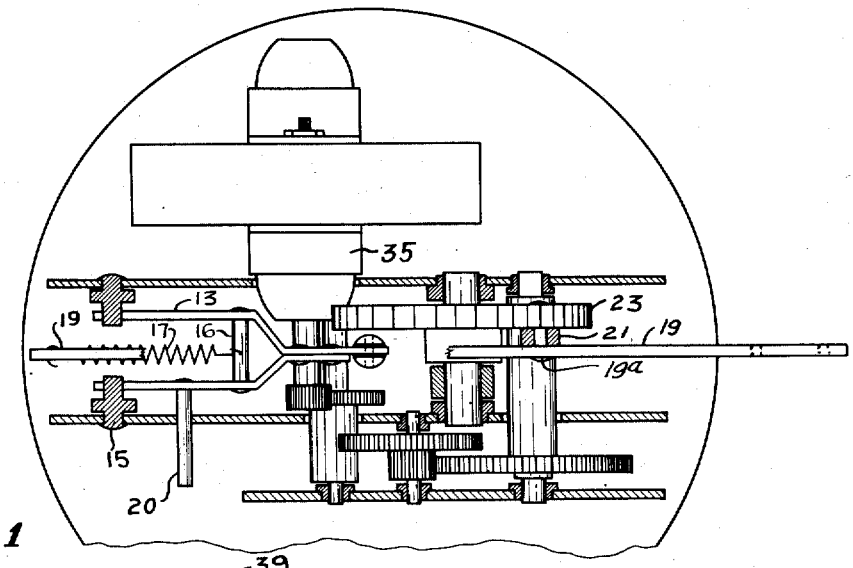

This invention relates to new and useful improvements in motor operated valves more particularly for use in controlling the fuel supply to heating systems or the like.

In devices now available, the fuel valve is actuated either by a solenoid having a reciprocating core attached to or constituting the valve stem, or the valve stem is directly operated by a motor through a train of intermeshing gear wheels. Both types are slow in their operation and allow the gaseous fuel mixture to become lean during the opening or closing operation, sometimes causing backfiring. Also, the motor operated type is designed to stall the motor with full voltage across the windings as the means for holding the valve in open position, which causes undesirable heating and often burns-up the motor windings.

In accordance with the present invention, these difficulties are eliminated by the employment of a snap-action valve, it being a primary object of the invention to provide a motor-operated valve, which is entirely disconnected from the motor and is actuated only by the action of a plurality of springs to both open and close the valve.

Still a further object of the invention is the provision of means to automatically introduce resistance in series with the motor when the valve reaches its open position with a consequent substantial reduction in current. The introduction of the resistance acts as an electric brake, which keeps the springs from returning the valve to its closed position.

Figure 2:
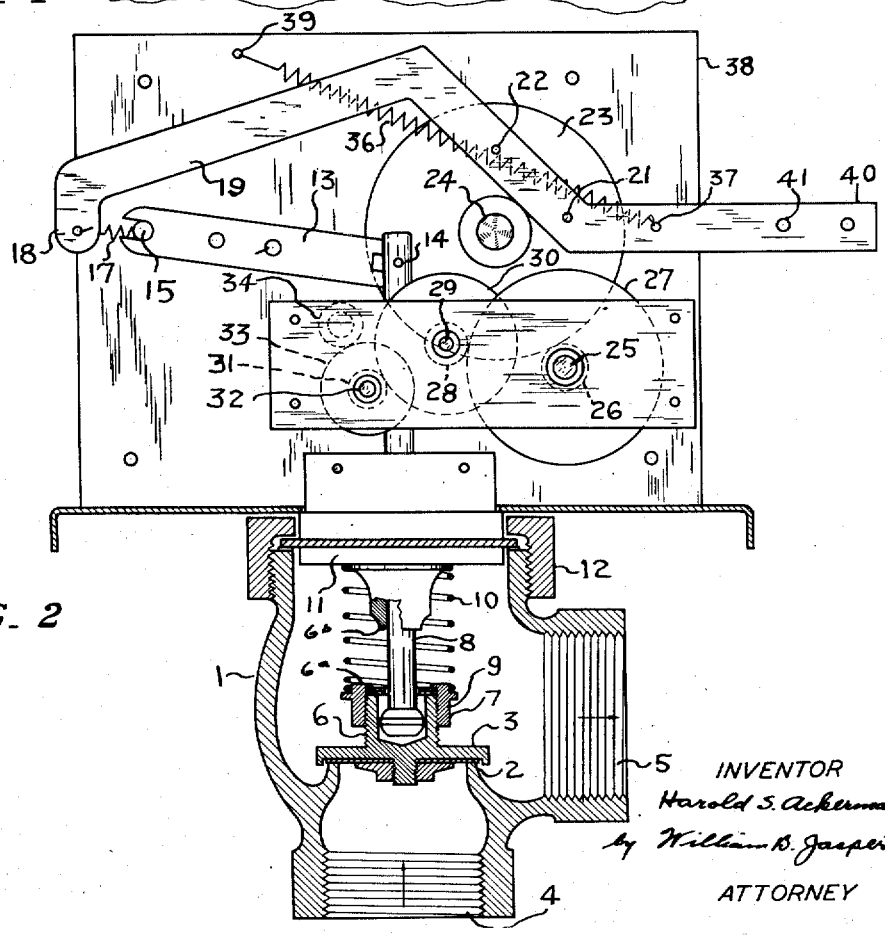
Figure 3:
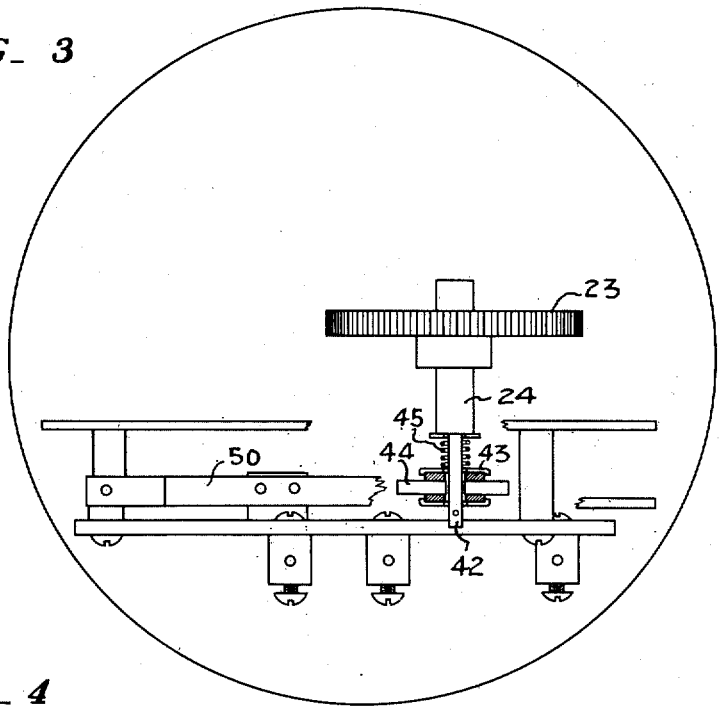
Figure 4:
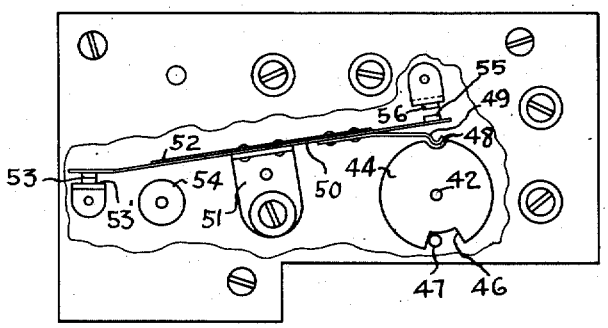
Figure 5:
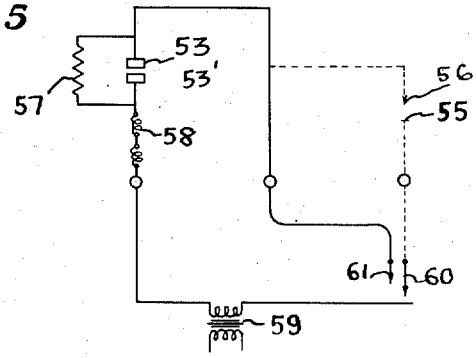

These and other objects of the invention will become more apparent from a consideration of the accompanying drawings constituting a part hereof in which like reference characters designate like parts and in which:

Fig. 1 is a plan view of a snap-action motor valve in accordance with the principles of this invention;

Fig. 2 a side elevational view of the valve operating mechanism showing the valve in vertical section;

Fig. 3 a plan view diagrammatically illustrating the motor terminals and control switch;

Fig. 4 a front elevation with the insulating panel partially cut away to show the automatic switch for maintaining the motor circuit and for introducing the resistance in said circuit; and Fig. 5 a wiring diagram of the motor circuit.

With reference to Figs. 1 and 2 of the drawings, the structure therein illustrated comprises a valve casing 1, having an inwardly extending boss 2, the top of which constitutes a seat for a valve 3. The casing 1 is provided with inlet and outlet passages 4 and 5, connected to a source of fuel supply and consumption, respectively. Valve 3 is provided with a threaded shank 6 which is hollow to receive a spherically shaped end 7 of a valve stem 8, a flanged ring-nut 9 being provided to retain the spherical end 7 of the stem in the threaded shank 6 of the valve, and to permit free alignment of the valve with its seat.

A coil spring 10 abuts against the flange of the ring-nut 9 at one end and against a support 11 at its other end, the latter being mounted on the valve casing by a ring-nut 12 to hermetically seal the valve chamber. A sheep-skin washer 6*a* seats against seat 6*b* when the valve is open, thus sealing the joint against gas leaks when the valve is open.

Valve stem 8 is connected at its upper end to a lever 13 which is pivoted to the valve stem 8 at 14 and is provided with a pair of trunnions 15, Fig. 1, about which the lever 13 fulcrums. Lever 13 is a bifurcated member and is provided with a cross member 16 to which is attached one end of a coil spring 17, the other end of which is connected to a depending portion 18 of lever 19. Lever 13 is provided with an arm 20 to render it manually operable.

Lever 19 is connected by bolts 19*a* at 21 and 22 to a gear wheel 23, mounted on shaft 24, to rotate with the latter. Gear wheel 23 meshes with pinion 26 mounted on shaft 25 that rotates with a gear wheel 27, which interacts with teeth of a pinion 28 of shaft 29, that rotates with gear wheel 30, which in turn interacts with the teeth of a pinion 31 of shaft 32 rotating with gear wheel 33, that engages the pinion 34 of an electric motor 35. And is apparent from the foregoing description of the gear train and motor, there is no positive connection of the motor with the valve stem 8. Neither is there any connection between lever 19 of gear wheel 23 with the valve stem 8, the only connection being with lever 13, through the coil spring 17. A spring 36 is connected to the lever 19 at 37 and to the panel 38 at 39.

The operation of the valve 3 by the hereinbefore described mechanism is briefly as follows: If the depending portion 18 of lever 19 is below the fulcrum of lever 13, as shown in Fig. 2 of the drawings, tension of spring 17 will act to pull lever 13 downward and the component of forces produced by the spring will be such as to lower the valve stem 8. Seating of the valve 3, however, is not only dependent upon the action of spring 17 as it will be apparent that the coil spring 10 will normally bias the valve 3 against its seat.

When the motor 35 is energized to operate the gear train to rotate gear wheel 23 in a clockwise direction, lever 19 will be subjected to angular movement, whereby its depending tip 18 will rise and when the component of forces exerted by spring 17 is sufficiently great because of the location of lever 18 above the fulcrum of lever 13, which is at the point of the trunnion members 15, lever 13 will be moved upward to open valve 3 by a snap action.

Clockwise movement of gear 23 with consequent movement of lever 19 will place spring 36, connected to the lever 19, under tension so that when the motor 35 is deenergized, the tension of the spring 36 will move the lever 19 in a counterclockwise direction past the position shown in Fig. 2, in which position the forces of spring 17 snap lever 13 downwardly with the result that valve 3 will seat instantly by action of the springs 10 and 17.

The air supply to the burner, if the valve is to be employed for supplying fuel, may be controlled by lever 19 by connecting the end 40 of the lever to dampers or other air control means, connections being made with perforations 41 of the lever 19. The motor is energized and stopped in the open position of the valve by means of the mechanism and circuit shown in Figs. 3 to 5 inclusive.

In Fig. 3 the shaft 24 rotated by gear wheel 23 is shown provided with an extension 42 on which is mounted a friction clutch 43 between which a fiber disk 44 is loosely mounted. One side of the friction clutch 43 is provided with a coil spring 45 that maintains proper contact of the clutch elements with the fiber disk 44 to rotate it. Fiber disk 44 is notched at 46 to form abutments for a pin 47 that limits the degree of movement of the disk, and a notch 48 is further provided to receive the spring finger 49 of a spring arm 50 secured to bracket 51. A spring arm 52 is provided to make and break contacts 53, the arm 52 being actuated by an insulator 54 that is carried by the arm 20 of the lever 13. A contact terminal 55 is provided on the arm 50 to engage a stationary terminal 56. The terminals 53, 55 and 56 are shown in the wiring diagram of Fig. 5. In the latter, the numeral 57 designates a resistance which is connected in the motor circuit when terminals 53 and 53' are open. Numeral 58 designates the motor winding; 59 a transformer; and 60 and 61 are contacts of a thermostat to render the motor operative in response to variations in room temperature. Thus contact 60 may be operative to close the circuit as soon as the temperature falls off, while the contact 61 will close when the temperature drops a predetermined amount such as 2°, for example.

The operation of the motor by the control contacts just described is briefly as follows: If the valve 3 is in the closed position, as shown in Fig. 2 of the drawings, and the valve is connected in a fuel supply line, any cooling of the room temperature in which the thermostat contacts 60 and 61 are located will close the circuit of the contact 60. A still further drop in temperature, such as 2°, will close contact 61, thus establishing the motor circuit, which energizes motor 35 to rotate the gear train for raising lever 19. Immediately upon rotation of the gear train, shaft 24 will rotate disk 44 to close contacts 55 and 56 so that if contact 61 is poorly made, the motor circuit will be maintained through contacts 60, 55 and 56. When lever 19 has risen to the position to produce the snap-action on lever 13, which opens valve 3, the arm 20 will raise the spring arm 52 and break contacts 53 and 53' which, when broken, as shown in Fig. 5 of the drawings, connects the resistance 57 into the motor circuit, which produces a magnetic braking action on the motor, and this small braking force on the motor is sufficient to hold the valve in its open position, thereby preventing unnecessary heating or possible damage to the electrical equipment. Instead of the braking effect produced by connecting the resistance in the motor circuit, the contacts 53 may be made to change the motor winding from a parallel connection during the motor operation to a series connection for the holding or braking position.

Upon the deenergization of the motor circuit brought about by the breaking of the contacts 60 and 61, the motor circuit of the resistance 57, and the bias of spring 36 produced by the opening movement of lever 19 will exert a force to return the lever to the closing position that produces a snap-action of lever 13 in the direction to close valve 3.

It will be apparent from the foregoing description of the invention that the snap-action motor valve operates instantaneously to open and close the valve, thus assuring proper fuel mixture if the valve is used for controlling the fuel supply to furnaces. It is also apparent that the characteristics of the operating mechanism and the motor control circuit are such as to render the motor positive in its operation of actuating the valve operating mechanism and make it effective as a magnetic brake after the valve is open without injury to the electrical system or the mechanical operating parts.

Although one embodiment of the invention has been herein illustrated and described, it will be obvious to those skilled in the art that various modifications may be made in the details of construction without departing from the principles herein set forth.

I claim:

1. A snap action motor valve for the control of fluids comprising in combination a valve, a spring normally operative to bias said valve to closed position, means operative to snap the valve to open position, a spring for actuating said last named means, and a lever for biasing said last named spring, said lever being mounted on a gear wheel for angular movement by a gear reduction mechanism having its free end connected to said last-named spring, and an electric motor for driving said mechanism.

2. A snap action motor valve for the control of fluids comprising in combination a valve, means normally operative to bias said valve to closed position, a plurality of levers, one of which is connected to the valve and the other of which is connected to a motor operated gear mechanism, said levers being connected by a spring only whereby the position of the last named lever produces a snapping movement of the other of said levers in response to rotative movement of said motor operated gear mechanism.

3. A snap action motor valve for the control of fluids comprising in combination a valve, means operative to normally seat the valve, means operative independent of said first named valve means to snap the valve to open position, said last named means comprising a plurality of levers, one of which is connected to the valve and the other being resiliently connected with said first named lever and being mounted to be subjected to angular movement by a gear drive.

4. A snap action motor valve for the control of fluids comprising in combination, a valve, means normally operative to bias said valve to closed position, means operative to snap the valve to open position, said means comprising a plurality of levers one of which is connected to said valve and the other having a resilient connection with the first named lever and being operatively connected for angular movement by gear reduction mechanism, a motor for actuating said gear mechanism, and means operated in response to movement of said gear mechanism for controlling the motor circuit to open said circuit and connect the motor circuit in series with a resistance.

5. A snap action motor valve for the control of fluids comprising in combination a valve controlling a flow passage, means yieldingly biasing the valve to closed position, spring means for actuating said valve to its open position, and additional spring means for releasing said valve opening means to render the first-named valve biasing means operative.

6. A snap action motor valve for the control of fluids comprising in combination a valve controlling a flow passage, means yieldingly biasing the valve to closed position, spring means for actuating said valve to its open position, and additional spring means for releasing said valve opening means to render the first-named valve biasing means operative, said last named spring means including a motor drive mechanism which, when energized, develops tension in the said spring means and which, when deenergized, renders the spring means operative to release the valve opening means.

7. A snap action motor valve comprising in combination, a valve normally biased to closed position, a snap action lever for actuating said valve, means operative to snap the valve to open position including a lever, a spring biasing said lever to valve closing position and a motor drive for actuating said lever to valve opening position, means for energizing said motor to apply normal current thereto including a movable contact operable by the snap action lever to disconnect the motor circuit, and a resistance shunted across said movable contact to provide a reduced current supply when said movable contact is opened.

HAROLD S. ACKERMAN.